US009108378B2

(12) United States Patent
Douglas

(10) Patent No.: US 9,108,378 B2
(45) Date of Patent: Aug. 18, 2015

(54) PRESS PADS

(75) Inventor: Melvyn Douglas, Rochdale (GB)

(73) Assignee: MARATHON BELTING LIMITED, Rochdale (GB)

( * ) Notice: Subject to any disclaimer, the term of this patent is extended or adjusted under 35 U.S.C. 154(b) by 0 days.

(21) Appl. No.: 14/236,511

(22) PCT Filed: Aug. 7, 2012

(86) PCT No.: PCT/GB2012/000640
§ 371 (c)(1),
(2), (4) Date: May 13, 2014

(87) PCT Pub. No.: WO2013/024237
PCT Pub. Date: Feb. 21, 2013

(65) Prior Publication Data

US 2014/0238616 A1 Aug. 28, 2014

(30) Foreign Application Priority Data

Aug. 17, 2011 (GB) ................................... 1114140.5

(51) Int. Cl.

| | |
|---|---|
| ***B32B 37/00*** | (2006.01) |
| ***B30B 15/06*** | (2006.01) |
| ***D03D 15/00*** | (2006.01) |
| ***D03D 15/08*** | (2006.01) |
| ***D03D 15/12*** | (2006.01) |

(52) U.S. Cl.
CPC ............... *B30B 15/06* (2013.01); *B30B 15/061* (2013.01); *D03D 15/00* (2013.01); *D03D 15/0027* (2013.01); *D03D 15/0083* (2013.01); *D03D 15/08* (2013.01); *D03D 15/12* (2013.01); *D10B 2101/20* (2013.01); *D10B 2401/061* (2013.01)

(58) Field of Classification Search
CPC ........... D02G 3/12; D02G 3/38; D03D 15/02; D03D 15/12; B30B 15/061; B32B 37/26
USPC ............................ 156/580, 581, 583.1, 583.3
See application file for complete search history.

(56) References Cited

U.S. PATENT DOCUMENTS 5,120,597 A * 6/1992 Takimoto et al. ............. 442/136
5,298,322 A * 3/1994 Hennecken et al. .......... 442/229

FOREIGN PATENT DOCUMENTS

| | | |
|---|---|---|
| DE | 102007024509A1 | 12/2008 |
| EP | 1336685A1 | 8/2003 |
| WO | 2007129041A1 | 11/2007 |

OTHER PUBLICATIONS

International Search Report for corresponding International Application No. PCT/GB2012/000640.

*Primary Examiner* — James Sells
(74) *Attorney, Agent, or Firm* — Egbert Law Offices, PLLC

(57) ABSTRACT

A press pad is provided for use in a laminate press. The pad comprises a woven fabric of heat resistant strands wherein at least a proportion of the weft comprises a core made up of a bundle of strands within a sheath of an elastomeric material and at least a proportion of the warp comprises metal strands. The strands forming the bundle are dose-packed prior to extrusion of the sheath around them. The transverse cross-sectional profile of the sheath is a regular geometric profile that is other than a circular profile prior to weaving of the fabric of the press pad. Preferably, the transverse cross-sectional profile of the sheath is a splined profile or a regular polygonal profile that is composed of straight lines or arcs.

15 Claims, 3 Drawing Sheets

(56) References Cited

U.S. PATENT DOCUMENTS

| | | | | |
|---|---|---|---|---|
| 5,617,903 | A | 4/1997 | Bowen, Jr. | |
| 5,855,733 | A * | 1/1999 | Douglas et al. | 156/583.1 |
| 6,413,889 | B1 * | 7/2002 | Best et al. | 442/305 |
| 6,737,370 | B2 * | 5/2004 | Espe | 442/200 |
| 6,780,280 | B2 * | 8/2004 | Halterbeck et al. | 156/583.3 |
| 7,892,990 | B2 * | 2/2011 | Douglas | 442/200 |
| 8,573,280 | B2 * | 11/2013 | Marxen | 156/581 |
| 2008/0311811 | A1 * | 12/2008 | Douglas | 442/184 |

* cited by examiner

PRESS PADS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a press pad for use in a laminating press for the production of laminate sheets, such as decorative laminates, laminated floorboards, and punted circuit boards, using low pressure and high pressure single daylight and multi daylight presses 2. Description of Related Art Including Information Disclosed Under 37 CFR 1.97 and 37 CFR 1.98.

The purpose of a press pad is to compensate for density variations in the laminate sheet being pressed and thereby to ensure that an equal pressure is applied to all parts of the sheet. In addition, the press pad compensates for any unevenness in the surfaces of the platens of the press itself and any flexure or bow mg of the platens when under pressure. Again, this assists in the product on of a flat, even density laminate. Thus, it is important for a press pad to be resilient and have a natural springiness to permit it to compensate for the aforementioned density variations and the surface unevenness of the press platens but also to allow it to relax after each pressing operation and recover its form to enable it to be used again. The capacity a press pad has to re-form itself after each pressing, namely its compensation capability, is an important characteristic to ensure a reasonable working life and to avoid unnecessary downtime of a press whilst the press pads are replaced.

However, because the purpose of the press is to apply heat to the laminate sheet whilst it is under pressure, it is important that the press pad also conducts the heat supplied by the press platens to the laminate sheet. Working temperatures for such presses are usually in a range up to 220° C.

Typically, therefore, a conventional press pad is a densely woven combination of high temperature-resistant, non-asbestos yarns and metal wire. The metal wire is included to give good heat transmission through the pad to the laminate sheet. In contrast, the non-metal yarn is required to give the pad the springiness and resilience required to enable the pad to relax after each pressing operation. The relative proportion of the two types of material is a consideration when devising a press pad for a particular purpose. Usually a compromise must be reached between the heat transference and the resilience or springiness required in each case.

A conventional press pad is described in WO9613376. The pad comprises a woven fabric of heat resistant strands such as copper wires wherein a substantial proportion of either the warp or the weft comprises a silicone elastomer. In practice, as shown in FIG. 1, the warp 1 usually comprises stranded or bunched brass or copper wire and the weft 2 usually comprises a silicone covered metal wire, in particular a stranded or bunched wire core 3 over which a sheath 4 of silicone has been extruded. As a result of the presence of the silicone 4, this press pad has a great resilience and springiness whilst the metal wires ensure that the press pad achieves good heat transference from the platens to the material being pressed. One disadvantage of press pads of this type is that in use when pressurized in a laminating press the silicone sheath 4 tends to be cut through at the crossing points of the warp 1 and the well 2 by a scissor-action of the stranded or bunched wire core 3 and the metal wires of the warp 1. Eventually, this causes the pad to wear out because over time the weave structure is flattened to such an extent that the press pad is unable to relax after each pressing operation and the pad loses its resilience and springiness.

In WO2007129041 is described a press pad that mitigates the aforementioned problem. In this press pad the wires within the core 3 of the well are not stranded or bunched but are arranged to lie substantially parallel to one another and to the longitudinal axis of the core 3, as shown in FIG. 2. This enables the Wires of the core 3 to move relative to one another and therefore to flatten out, potentially into the same plane when the pad is pressurized when in use. This reduces the tendency of the warp wires 1 to cut into the silicone sheath 4 of the well 2.

Also described within WO2007129041 is the possibility of using a weft Wherein the wires 3 are arranged to lie in the same plane of the core when they are not under any applied pressure. This involves the extrusion of an elastomeric sheath 4 in a non-circular, cross-sectional profile, for example an oval cross-sectional profile. However, such a well is ribbon-like, being, significantly wider than it is thick. Weaving such wells to produce a satisfactory press pad is difficult as all wefts tend to twist during weaving so that the resulting press pad would have an uneven thickness and differently sized interstices between the warp and well owing to the twists in the weft. This is undesirable because the number of contact points between the warp and the well in any given surface area of the resulting pad is reduced which in turn reduces the compensation capabilities of the pad. Even if it Were possible to weave a pad with a ribbon-like well that remained untwisted, increasing the width of the well in any plain or twill weave results in a reduction in the number of well insertions or picks over a given length of woven fabric. This is also undesirable because the number of contact points between the warp and press platens in any given surface area of the resulting pad is thereby reduced which in turn reduces the beat transfer capabilities of the pad, The primary object of the present invention is to provide a press pad wherein elastomeric material forms a greater percentage of the overall pad volume than in conventional pads and thereby produce an enhanced compensating ability or 'spring' effect without significantly reducing the heat transfer capability of the pad.

BRIEF SUMMARY OF THE INVENTION

In preferred embodiments it is a further object of the present invention to overcome the aforementioned disadvantages of conventional pads and to provide a pad wherein the elastomeric material remains intact for a longer period because the tendency for it to be cut by metal strands in the warp is reduced.

According to the present invention there is provided a press pad for use in a laminate press comprising a woven fabric of heat-resistant strands wherein at least a proportion of the weft comprises a core made up of a bundle of strands within an extruded sheath of an elastomeric material and at least a proportion of the warp comprises metal strands, characterized in that the strands forming the bundle are close-packed prior to extrusion of the sheath around them and in that the transverse cross-sectional profile of the sheath is a regular geometric profile that is other than a circular profile prior to weaving of the fabric of the press pad.

Both herein and in the claims the term 'close-packed' is to be interpreted as meaning that in any transverse cross-sectional plane through the strands forming the bundle, the strands are arranged so that they occupy the minimum practical amount of space and therefore have the highest practical density, there always being a small degree of drift of the strands during the extrusion process from an ideal dose-packed arrangement. The arrangement described in WO2007129041 wherein the weft comprises strands arranged to lie in the same plane of the core when they are not under any applied pressure does not, therefore, fall within the scope of this definition as the strands are not close-packed prior to extrusion of the sheath around them.

It is known that the resistance to pressure of a press pad is dependent on the weave density. This resistance increases the closer adjacent elastomeric weft strands are to one another in the weave as the pressure is applied, to the pad in use. It has been found that altering the transverse cross-sectional profile of the elastomeric sheath, which conventionally is circular, to a regular geometric profile that is other than a circular profile while retaining the strands in the core in a close-packed bundle enables the quantity of elastomeric material within a pad to be increased with a consequent increase in the compensating ability of the pad.

Preferably, the transverse cross-sectional profile of the sheath is a profile or a regular polygonal profile that is composed of straight lines or arcs. In the case of a splined profile, preferably the profile has at least six and advantageously at least twelve splines. Preferably, the splines or all the angles of the polygonal profile form projections outwards from the welt surface from hypothetical in-circle of the profile.

The use of such a profiled weft means that the weave contains more elastomeric material than would be the case if the cross-sectional pro file were circular because a non-circular profile will distort sufficiently at the crossing points between the warp and the weft to permit the same number of picks or weft insertions per decimeter as in a weave using a weft with a circular cross-sectional profile. However, the quantity of elastomeric material within any given volume of the pad will be greater. During the weaving process, pressure is exerted on the elastomeric material of the well at the crossing points between the warp and the well and causes localized distortions in the elastomeric material. The use of a splined profile or as regular polygonal profile means that the splines or projecting angles of these profiles bear this pressure so that the load per unit area at the points of contact between the warp and the weft is significantly greater than if a circular profile were used. This load readily compresses the splines or angular projections at every crossing point but critically the underlying main body of the elastomeric profile is no more distorted than is the elastomeric profile in well with a conventional circular profile.

Whilst a simple increase in the diameter of the sheath of a circular profile may appear to have the same effect, as the elastomeric material is typically a flexible siloxane that can be forced into place, it is a mathematical fact that whatever the maximum diameter of a weft with a circular profile that could be comfortably woven without reducing the number of picks per decimeter, significantly more elastomeric material is included in the weave by using as splined profile or a regular polygonal profile wherein the aforesaid maximum diameter is either the base in-circle of a splined profile or the in-circle of a regular polygonal profile.

Preferred additional features of the invention are described in the dependent claims appended hereto.

BRIEF DESCRIPTION OF THE DRAWINGS

The present invention and examples of wefts with different cross-sectional profiles for use in embodiments of the invention will now be described by way of example with reference to the accompanying drawings, in which.

DETAILED DESCRIPTION OF THE INVENTION

As indicated, above, the elastomeric material, used in the production of a sheathed well for press pads is typically a siloxane, usually silicone or fluoro-silicone although other elastomeric materials may be used. The production of an elastomeric-sheathed weft is typically carried out by extruding the elastomer over a core comprised of a bundle of strands, for example wire strands, using a cross-head extrusion machine. The bundle of strands comprising the core passes through a tip into a flow of the elastomer and thence through a die, which controls the shape and thickness of the resulting, sheath.

Figure 4:
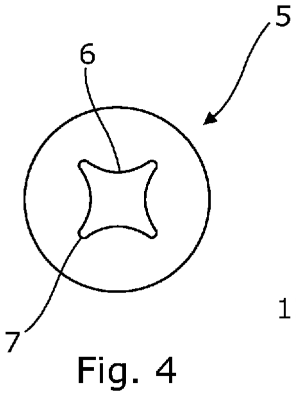
FIG. 4 is a diagram showing a profile of a die for use in the production of a siloxane extrusion with a square transverse cross-sectional profile.

Dies capable of producing cross-sectional profiles as shown in FIGS. 3*a* to 3*e* can be readily produced by a man skilled, in the art although it should be appreciated that the die may not always mirror the resulting profile of the weft. This is because the flow of siloxane should be uniform through all parts of the die. Sharp corners in the die tend to produce excessive drag, resulting in rough edges on the extrusion. This effect can be overcome by putting a slight radius on all corners. Non-uniform flow also results when some parts of the die opening are smaller than others in a cross-sectional area. This can be corrected by providing a shorter land at the constriction. The land is shortened by drilling or machining away part of the thickness of the die. Conversely, uniform flow can be obtained by slowing the flow through large openings in the die. This is done by installing a dam on the upstream side of the die to retard the flow. For example, as shown in FIG. 4, in a die 5 for producing a siloxane extrusion with a square transverse cross-sectional profile, sides 6 of the "square" die opening are made convex so that straight sides are formed in the extrusion. This is because the siloxane swells upon leaving the die 5.

Figure 1:
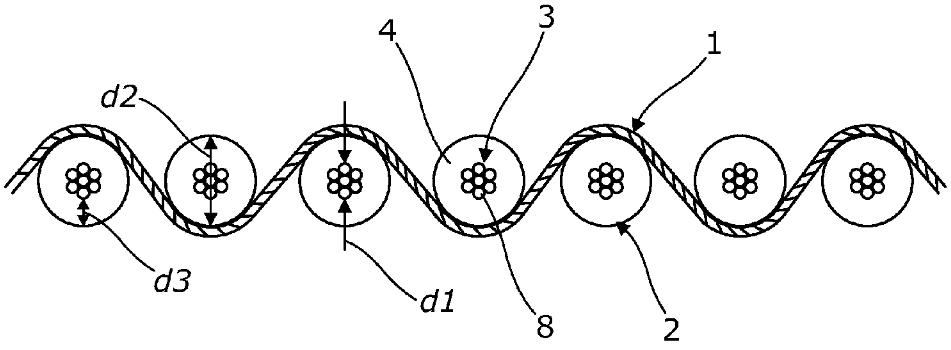
Fig. 1 (Prior Art)
FIG. 1 is a schematic cross-sectional view of a conventional press pad prior to any use.
Figure 2:
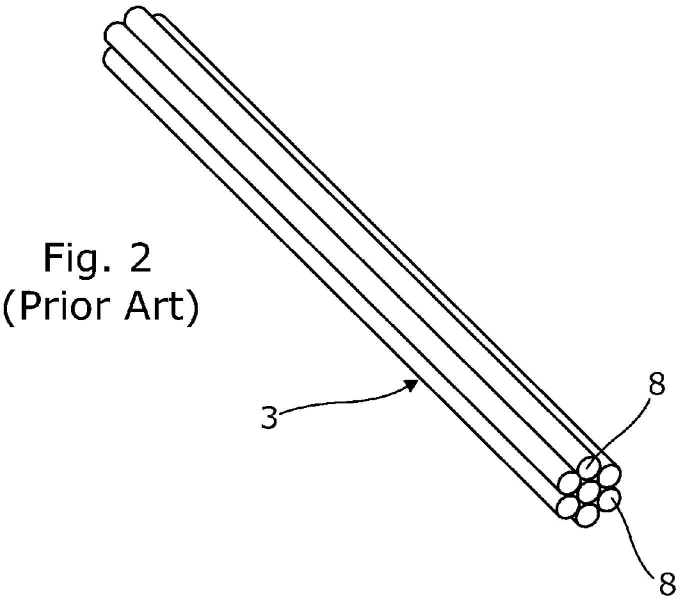
Fig. 2 (Prior Art)
FIG. 2 is a perspective view of a length of a bundle of strands forming a core of a weft strand of a conventional press pad.
Figure 3A:
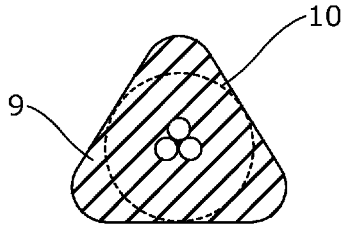
FIGS. 3*a* to 3*e* are cross-sectional views, to an enlarged scale in comparison to FIG. 1, of wefts having five different cross-sectional profiles respectively in accordance with the present invention.
Figure 3B:
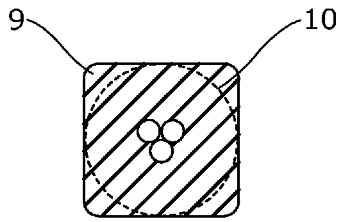
Figure 3C:
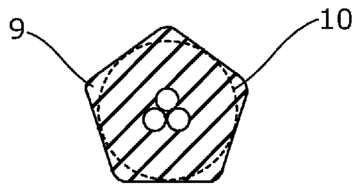
Figure 3D:
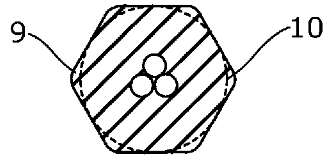
Figure 3E:
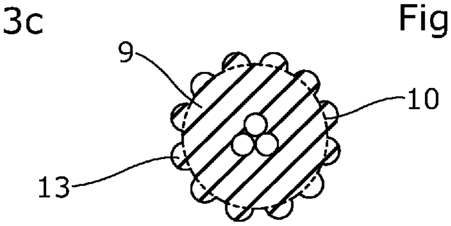

In most conventional press pads, for example that shown in FIG. 1, the core 3 of the weft 2 comprises seven wire strands 8 that may either be twisted together or be untwisted and lie parallel to one another and to the longitudinal axis of the core 3 as shown in FIG. 2. Typically, the strands 8 each have a diameter of 0.2 mm so that the overall wire diameter d1 is 0.6 mm. When coated with the siloxane sheath 4, the outside diameter d2 of the silicone-covered weft 2 is typically 1.4 mm, thus making the wall thickness d3 of the silicone 0.4 mm when the pad is in an unused state. However, if a weft is used that has a transverse cross-sectional profile that is a regular geometric, profile other than a circular profile, it is possible to increase the quantity of elastomer for any given diameter of in-circle based on the geometric profile.

In FIGS. 3*a* to 3*e* are transverse cross-sectional views of wefts having five different regular geometric cross-sectional profiles, namely a triangular profile, a square profile, a pentagonal profile, a hexagonal profile and a splined profile respectively. In the case of the polygonal profiles, namely the triangular, square, pentagonal and hexagonal profiles, the angular corners are rounded, as is required in extrusion processes. In the case of the splined profile, preferably the splines are semi-circular but other shapes of splines, for example triangular splines, could be used. In the illustrated embodiments, the sides of the polygonal profiles are formed by straight lines but it would also be possible for the polygons to have arced sides, for example in the manner of Reuleaux polygons.

The following table, Table 1, gives an indication of the estimated volumetric increase in the elastomer of a sheath 9 that can be achieved using the illustrated, profiles as compared with a circular profile. The calculations are based on a 1.4 Mm diameter in-circle 10, which is shown in dotted lines in FIGS. 3*a* to 3*e*, and on profiles using either three strands 11 of 0.2 mm diameter in the core 12 or seven strands of 0.2 mm diameter in the core 12. In the case of the splined profile shown in FIG. 3*c*, the calculations have been carried out assuming that there are twelve semi-circular splines 13 uniformly spaced around the in-circle 9 that each have a radius of 0.125 mm.

TABLE 1

| | % volumetric increase in elastomer | |
|---|---|---|
| Profile | 3 strands in the core | 7 strands in the core |
| Triangle | 103% | 113% |
| Square | 29% | 32% |
| Pentagon | 16% | 18% |
| Hexagon | 11% | 12% |
| Splined | 20% | 22% |

It can be seen that the greatest volumetric increase is achieved with a triangular profile. However, from a practical point of view such a profile presents difficulties because the size of the angular projections beyond the diameter of the in-circle 10 are large and are not as readily compressed by the warp at the crossing points of the warp and weft. Without increasing the tension of the warp, which may be undesirable, this can lead to a decrease in the number of picks per decimeter, which defeats the object of the invention. This leaves the square profile and the splined profile as the best of the various profiles under consideration. However, the use of weft with a square profile also has potential problems. Ideally, weft with a square profile should be inserted into a weave so that the well strands are perfectly aligned with one another so that the surface of the pad has a flat appearance. However, it is unlikely to be possible to insert such weft strands into a weave without introducing some deuce of twist. Given that some degree of twist has to be accepted, a further problem arises in that the lay of any twist introduced is unlikely to be consistent across the width of the loom and between different weft insertions. This would give the resulting press pad an uneven appearance.

Such problems with twist in the weft do not occur to the same extent with the splined profile, partly because the number of splines evens out any requirement for orientating the weft in a particular fashion. This is one reason for using a splined profile with a large number of splines 13. Preferably, the profile has at least six and advantageously up to twelve splines 13, which is the maximum it is practical to use given the dimensions of the well. Also, for any given volumetric increase in the quantity of elastomer used for any given size of in-circle 10, the greater the number of splines provided to make up this increase the easier they will be to compress at the warp and weft crossing points. This reduces the problem outlined above with the triangular profile and is another reason for using a profile with twelve splines 13, Table 1 above gives an indication of the estimated volumetric increase in the elastomer of the sheath that can be achieved using a splined profile based on a 1.4 mm diameter in-circle 10 with twelve semi-circular splines 13 uniformly spaced around the profile that each have a radius of 0.125 mm. Preferably, the sheath 9 has an in-circle diameter between 1.25 mm and 2.0 mm inclusive and splines 13 that each has a radius between 0.1 mm and 0.2 mm inclusive. The following table, Table 2, gives the estimated volumetric increase in the elastomer of the sheath 9 that can be achieved using differently sized in-circles 10 and differently sized semi-circular splines 13, assuming in each case that there are twelve splines 13 regularly arranged around the in-circle 10.

TABLE 2

| | % volumetric increase in elastomer | | | |
|---|---|---|---|---|
| In-circle Diameter | 12 splines of 0.1 mm radius | 12 splines of 0.125 mm radius | 12 splines of 0.15 mm radius | 12 splines of 0.18 mm radius |
| 1.25 mm | 17% | 26% | 37% | Impractical |
| 1.5 mm | 11% | 18% | 25% | 36% |
| 2.0 mm | 6% | 10% | 14% | 20% |

From these results, it can be seen that a weft with a 1.25 mm in-circle diameter and twelve splines of 0,15 mm radius or a weft with a 1.5 mm in-circle diameter and twelve splines of 0.18 mm give the greatest percentage volumetric elastomer increase.

In the present invention, strands 11 making up a core 12 of the weft are preferably metal strands but may comprise any of the following, namely copper wires, brass wires, stainless steel wires, copper alloy wires, aramide yarns, glass strands or filaments, and aromatic polyamide yarns. The choice of strands 11 used will depend on the purpose of the press pad, the desired degree of heat transference and resilience or springiness required. However, as stainless steel wire has a greater tensile strength and a greater shear strength than copper wire, a core 12 made up of three strands 11 of stainless steel wire exhibits the similar tensile and shear strengths as a core 12 made up of seven strands of copper wire. Hence, as it is desired to maximize the volume of elastomer in the weft, preferably instead, of seven strands 8 of copper wire being used to form the core 3, as shown in the prior art arrangements in FIGS. 1 and 2, three strands 11 of stainless steel wire are used instead, as shown in FIGS. 3*a* to 3*e*. The space taken up by the "missing" four wires is therefore taken up by more of the elastomer. The use of stainless steel for the core 12 also has the advantage that any problems which may be encountered with metal fatigue owing to the springiness of the pad are mitigated, copper wire being more susceptible to metal fatigue than stainless steel wire.

While the present invention can be used with a core 12 wherein the strands 11 are stranded or bunched, which means that they are twisted together, preferably the strands 11 in the core 12 comprise a bundle of strands that are substantially parallel to one another and to the longitudinal axis of the core, such as is shown in FIG. 2. This enables the strands 11 to collapse when under pressure so that they move relative to one another and flatten out during use. Such a pad remains intact for a longer period because the tendency for the elastomeric material to be cut by metal strands in the warp is reduced.

Figure 5A:
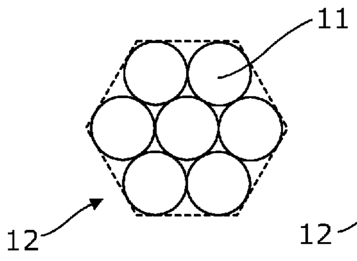
FIGS. 5*a* and 5*h* are diagrams showing a core of a weft for use in a press pad according to the present invention that is made up of seven close-packed strands and of three close-packed strands respectively.
Figure 5B:
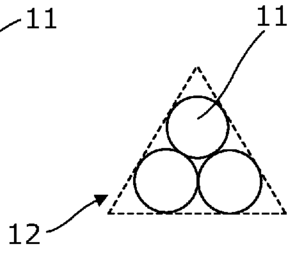

In addition to the foregoing, the strands 11 forming the core 12 should be close-packed, as defined above, so that they occupy the minimum practical amount of space. This means that in a transverse cross-section, the strands 11 in one row will nestle between the strands of adjacent rows. If there are seven strands, then they will lie within the outline of a hexagon, as shown in FIG. 5*a*, whereas if there are three strands 11 then they will lie within the outline of a triangle, as shown in FIGS. 5*b*. The close-packing enables the wall thickness of the extruded elastomeric sheath surrounding the core 12 to be maximized. To this end, the strands making up the bundle that is fed through the tip of the extrusion machine are close-packed prior to extrusion of the sheath around them. If the strands 11 are twisted together, for example if they are stranded or bunched, then the twist in the bundle will hold the strands in a close-packed configuration in any event. However, if the strands lie parallel to one another and to the longitudinal axis of the bundle, then the tip acts to retain the strands in a close-packed configuration as they pass through the extrusion machine. However, as the bundle passes through the die there has to be a small amount of free movement of the strands to avoid jamming, so that in practice there may be a small degree of drift of the parallel strands out of a close-packed pattern after extrusion of the sheath 9.

The warp must also be chosen with the intended, purpose of the press pad in mind. The warp weaves around the weft from the top to the bottom of the pad. It therefore forms the main conduit for heat transfer through the pad. For this reason a large proportion and preferably all of the warp usually comprises metal strands and may take the form of metal wires, in particular wires made from copper, brass or other copper alloys which all have a high heat conductivity. Preferably, the warp also comprises a plurality of substantially parallel, untwisted metal strands, for example seven parallel strands, so that they also flatten under pressure in use. As a warp that comprises a plurality of completely parallel, untwisted metal strands can be difficult to work with it is advantageous for the warp to have at least some degree of twist. Preferably, therefore, the warp is composed of a plurality of metal strands each having a diameter of the order of 0.2 mm with a lay of at least 25 mm. Such a lay is an improvement on the conventional lay of 15 mm but the greater the lay, and therefore the least amount of twist in the metal strands, the better.

Figure 6:
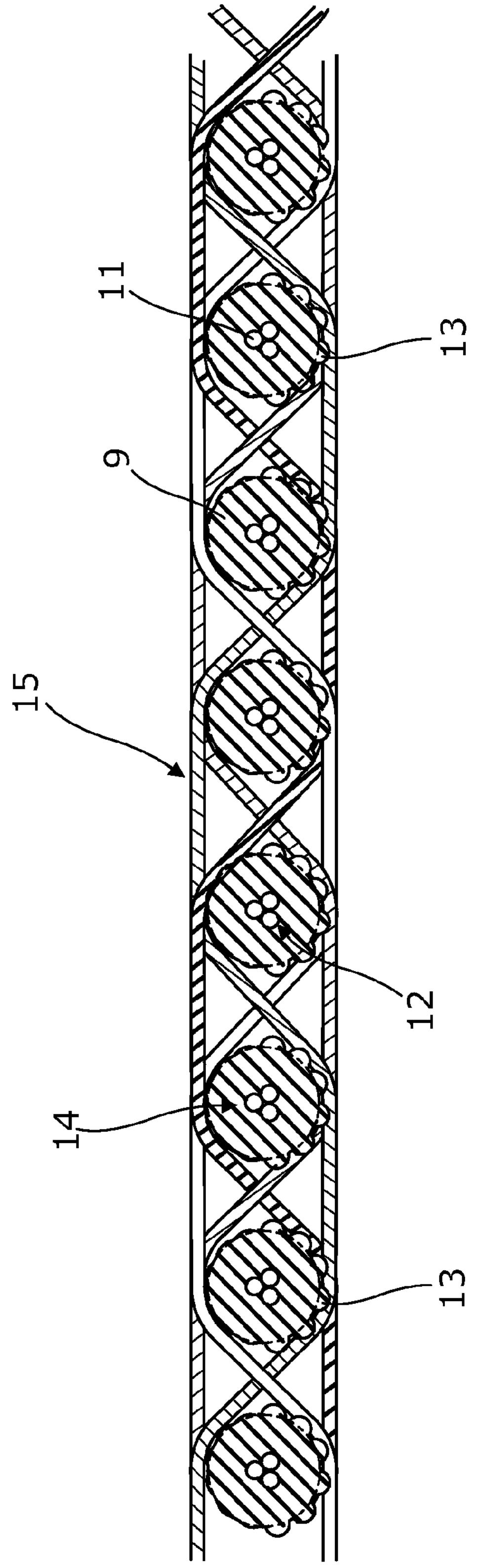
FIG. 6 is a cross-sectional view of an embodiment of a press pad in accordance with the present invention that has been woven in a twill weave.

A press pad in accordance with the present invention maybe woven in a plain weave, similar to that shown schematically in FIG. 1 wherein there is a single weft insertion under each warp 'wave', or in a twill weave wherein there are two weft insertions under each warp 'wave'. Other weaves are also possible. An example of one embodiment of a press pad according to the invention is shown schematically in FIG. 6. This embodiment is woven in a twill weave with a well 14 having a splined profile as described, above and a warp 15. Four warp strands 15 are shown, each of which is delineated either by different forms of cross-hatching in the case of three of the four strands, or no cross-hatching. At the cross-points of the warp 15 and the weft 14, the splines 13 of the sheath of the well are distorted and effectively crushed but elsewhere the splines project. The splines add to the elastomeric content of the pad without detracting, from the heat transfer capability of the warp 15.

It will therefore be appreciated from the foregoing that the present invention provides a press pad that has an increased, quantity of elastomeric material and therefore, enhanced compensation ability without any noticeable reduction in the heat transfer capability of the pad.

The invention claimed is:

1. A press pad for use in a laminate press, the press pad comprising:

a woven fabric of heat-resistant strands wherein at least a proportion of a weft of said woven fabric has a core formed of at least three strands within an extruded sheath of an elastomeric material and at least a proportion of a warp of said woven fabric is formed of metal strands, wherein said at least three strands are close-packed so that the strands occupy a minimal amount of space prior to the extrusion of the sheath around the strands, the sheath having a transverse cross-sectional profile of a non-circular regular geometric shape prior to weaving of the fabric.

2. The press pad of claim 1, wherein said transverse cross-sectional profile of the sheath is a splined profile or a regular polygonal profile that is composed of straight lines or arcs.

3. The press pad of claim 2, wherein the splined profile has at least six splines.

4. The press pad of claim 2, wherein the splined profile has twelve splines.

5. The press pad of claim 1, wherein the sheath has a splined profile having an in-circle diameter between 1.25 mm and 2.0 mm inclusive and splines that are semi-circular with a radius between 0.1 mm and 0.2 mm inclusive.

6. The press pad as of claim 2, wherein the splines or the angles of the polygonal profile form projections outwards from a surface of said weft.

7. The press pad of claim 1, wherein the strands forming the bundle lie substantially parallel to one another and to the longitudinal axis of said core.

8. The press pad of claim 1, wherein the core comprises a plurality of strands selected from the group consisting of copper wires, brass wires, stainless steel wires, copper alloy wires, aramide yarns, glass threads or filaments, and aromatic polyamide yarns.

9. The press pad of claim 1, wherein the core comprises up to seven metal strands.

10. The press pad of claim 1, wherein the core comprises three stainless steel strands.

11. The press pad of claim 6, wherein the strands each have a diameter of approximately 0.2 mm.

12. The press pad of claim 1, wherein the elastomeric material comprises a siloxane.

13. The press pad of claim 1, wherein the warp comprises metal wire composed of a plurality of metal strands that lie substantially parallel to one another.

14. the press pad of claim 13, wherein the wire is composed of a plurality of metal strands each having a diameter of approximately of 0.2 mm with a lay of at least 25 mm.

15. The press pad of claim 1, wherein the woven fabric is woven in a plain weave or a twill weave.

* * * * *